Oct. 21, 1969  P. J. KIRCHER  3,473,859
SUPPORT STRUCTURE FOR DOMESTIC APPLIANCE
Filed April 11, 1968
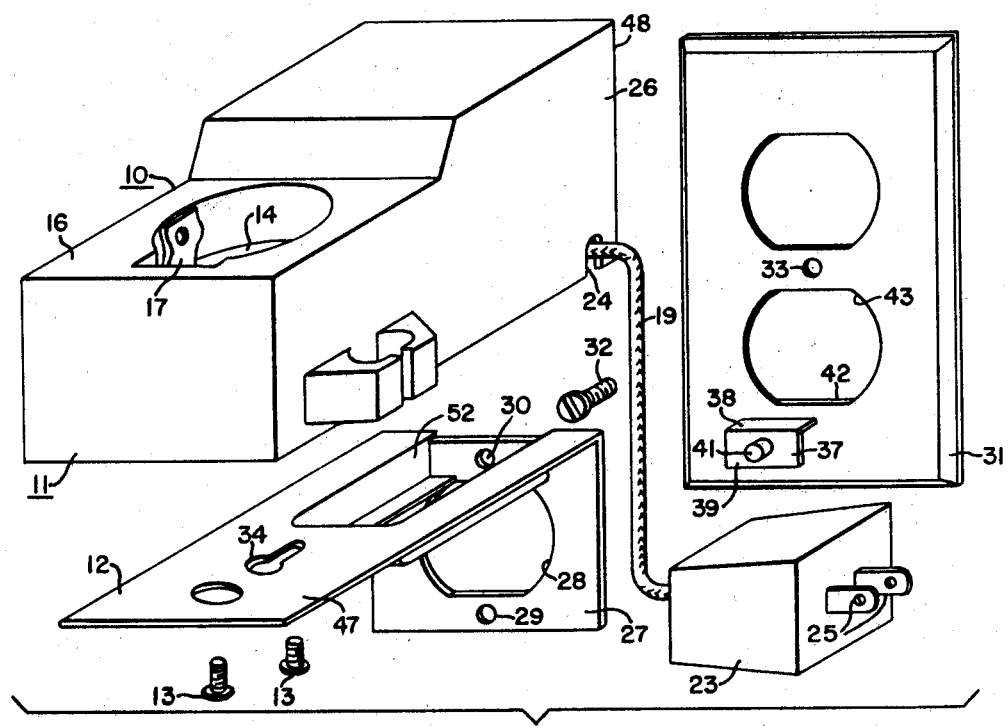
FIG. 1
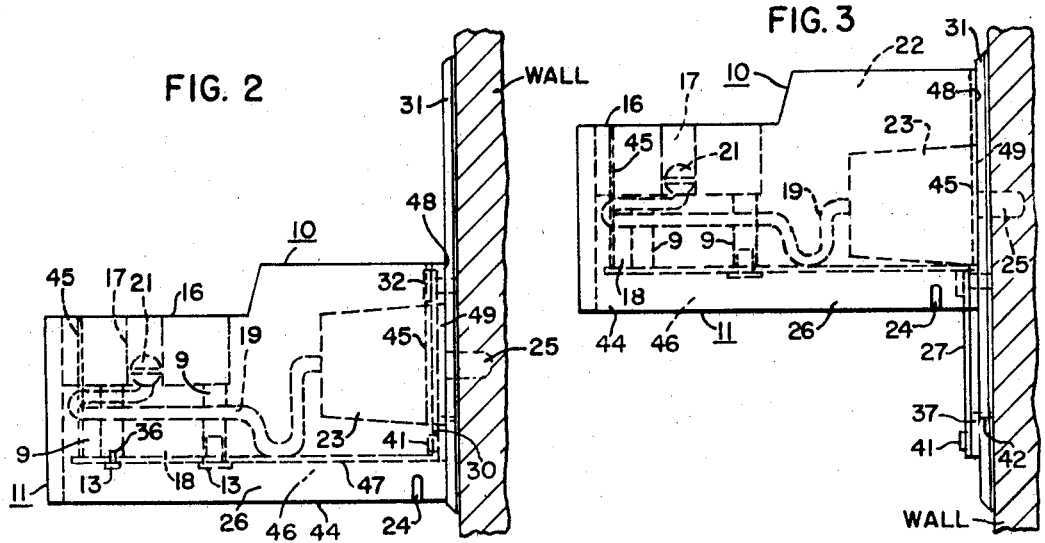
FIG. 2
FIG. 3
WITNESSES
Helen M. Farkas
James F. Young
INVENTOR
Paul J. Kircher
BY

United States Patent Office 3,473,859
Patented Oct. 21, 1969

3,473,859
SUPPORT STRUCTURE FOR DOMESTIC APPLIANCE
Paul J. Kircher, Mansfield, Ohio, assignor to Westinghouse Electric Corporation, Pittsburgh, Pa., a corporation of Pennsylvania
Filed Apr. 11, 1968, Ser. No. 720,663
Int. Cl. A61c 17/00; A47b 81/02
U.S. Cl. 312—209                                      6 Claims

ABSTRACT OF THE DISCLOSURE

Support for a battery-powered appliance, for example, a toothbrush. The support is characterized by being adapted to be mounted on a wall, to be placed on a counter top or to be mounted over a standard electrical wall receptacle, the support being so constructed that when mounted over a standard electrical wall receptacle it does not prevent use of an adjacent outlet.

BACKGROUND OF THE INVENTION

This invention relates, in general, to battery-operated appliances such as a toothbrush or the like and, more particularly, to support structure therefor.

It will be appreciated that the most desirable place, for storing an appliance such as contemplated, is in the bathroom. Within the bathroom the most convenient place for the appliance is near an electrical outlet, so that it may be plugged in, for charging, without being moved.

Relative to the electrical outlet, the appliance may be mounted in a somewhat conventional manner, on a wall of the room, or on the wall receptacle cover plate. A third choice would be to simply set the appliance on a counter.

Ordinarily mounting of the appliance on the wall is the most convenient but the least desirable from the standpoint of damaged plaster and the danger of the appliance pulling away from the wall and dropping to the floor.

While some bathrooms have a proper counter or surface, i.e. level, for supporting an appliance, most do not. Furthermore, the appliance is too easily knocked from such a surface, where it is not anchored.

The most desirable place for the appliance is, of course, mounted to the cover plate of the electrical outlet, however, the electrical outlet is not always in a convenient location.

Since there is no standardization in bathroom design, it will be apparent that an appliance provided with means for supporting it in a number of ways, such that mounting thereof is possible regardless of the room design.

Accordingly, it is the general object of this invention to provide a new and improved support for a battery operated appliance.

It is a more particular object of this invention to provide a new and improved support for a battery operated appliance, which support is capable of storing the appliance in various modes, in order to be compatible with all bathrooms.

SUMMARY OF THE INVENTION

Briefly, the above-cited objects are accomplished by providing a housing having cavities therein and open bottom and rear walls. The top wall of the housing is provided with a recessed area for receiving an appliance, for example, a toothbrush, the recess containing therein a pair of charging contacts. An L-shaped bracket is adapted to be secured to the housing such that the foot portion of the bracket lies in the same plane as the open rear wall of the housing but extends in the opposite direction. This arrangement allows the housing to be mounted over a two-plug electrical outlet plate with one of the outlets exposed for use with some other appliance without being obstructed by the toothbrush.

The bracket can also be attached such that the rear opening of the housing and the foot portion of the L-shaped bracket are superimposed, such positioning of the L-shaped bracket permitting wall mounting of the housing or resting of the housing on a flat surface.

Further objects and advantages of the present invention will become more apparent when considered in view of the following detailed description and drawings.

DESCRIPTION OF THE DRAWINGS

FIGURE 1 is an exploded perspective view of a support structure representing the invention;

FIG. 2 is a side elevational view of one mode of mounting the appliance support shown in FIGURE 1; and FIG. 3 is a side elevational view of another mode of mounting the support shown in FIGURE 1.

DESCRIPTION OF THE PREFERRED EMBODIMENT

Referring now to the drawings, especially FIG. 1, reference character 10 designates generally a support structure for a battery operated appliance. The support structure 10 comprises a housing 11, made from any suitable electrically non-conducting material, for example, plastic. The structure further comprises an L-shaped wall mounting member 12 which is adapted to be secured to the housing 11 by a pair of fasteners, herein disclosed as screws 13, the screws being received in post members 9. The member 12 is made from any suitable rigid material, for example, steel.

The housing 11 has a recessed area 14 in a top wall 16 thereof. The recessed area 14 has disposed therein a pair of charging contacts 17, only one of which is shown, and a toothbrush power handle is received in the recessed area 14 intermediate the contacts 17. As shown in FIGS. 2 and 3, the interior of the housing 11 is hollow as indicated at 18 for the receiving conductor wires 19 (only one being shown), suitably attached to the charging contacts 17 as by screws 21. The housing 11 is also interiorly hollow as indicated at 22 for containing a power plug 23 comprising prongs 25, a step-down transformer and a rectifier (not shown). Since it is necessary for the power plug 23, with certain operative modes of the support structure 10, to be external of the housing 11, a feed through notch 24 is provided in each side wall 26 of the housing 11.

The L-shaped member 12 comprises a foot portion 27 having a relatively large opening 28 therein, through which the plug 23 can extend when contained with the housing 11 during operation. The L-shaped member 12 further has a pair of smaller apertures 29 and 30 which apertures are utilized for mounting of the L-shaped member over an electrical outlet cover plate 31. A plate such as the plate 31 is conventionally attached to an outlet by means of a screw similar to a screw 32 which is insertable through an aperture 33 in the plate 31. The difference between the screw 32 and the screw which normally mounts the cover plate being the difference in length. In mounting the L-shaped member over the cover plate 31, the screw 32 is inserted through the apertures 30 and 33 and tightly screwed into a threaded aperture (not shown) residing in the electrical outlet, also not shown.

While the screw 32 is capable of supporting the L-shaped member 12 and the housing 11, which is attached to the L-shaped member by means of the screw 13 inserted through an opening 34 and received in a rib member 36 in the housing 11, an angulated element 37 having mutually perpendicular legs 38 and 39 is provided to assist in mounting the structure 11. The element 37 has a protuberance 41 thereon which is received in the aperture 30, as shown in FIG. 2, or in aperture 29, as shown in FIG. 3, depending on the mode of mounting the member 12. The leg 38 rests on a lower edge 42 of an aperture 43 in the cover plate 31 (see FIGS. 1 and 3). It should be apparent that the angulated element 37 prevents rotation of the structure 10 about the screw 32. When mounting of the structure 10 to a flat wall is contemplated, a pair of conventional screws, not shown, may be used in conjunction with the apertures 29 and 30.

The housing 11 has an opening in its bottom wall 44 as indicated at 46 such that the leg 47 of the L-shaped member 12 may be received between the side walls 26 without protruding beyond the lower edges thereof. The purpose of the foregoing is to enable the structure 10 to rest squarely on a counter top when assembled as shown in FIG. 2. The rear wall 48 also has an opening as indicated at 49 for receiving the foot portion 27 in a manner to permit flush mounting of the wall 48 against either a wall or a cover plate such as shown in FIG. 2. Suitable ribs 45 serve to space the L-shaped member relative to the walls 44 and 48.

The elongated leg portion 47 of the L-shaped member 12 has a cutout portion 52 for convenience in installing screws through the apertures 29 and 30.

It should now be apparent that there has been provided a support structure for a battery operated appliance which support structure can be employed in various modes to accommodate different bathrooms, or for that matter different room designs.

Since numerous changes may be made in the above-described structure and different embodiments of the invention may be made without departing from the spirit thereof, it is intended that all matter contained in the foregoing description or shown in the accompanying drawings shall be interpreted as illustrative and not in a limiting sense.

I claim:

1. Support structure for a hand-held appliance, said structure comprising:
   an electrically non-conducting housing having top, bottom, front, rear and side walls,
   said top wall having a recessed area therein for receiving an appliance to be supported,
   a wall mounting member detachably secured to said housing,
   said wall mounting member comprising cooperating segments one of which is at least partially co-extensive with said bottom wall,
   the other of said cooperating segments being provided with means adapting it for attachment to a wall or the like and being disposed in substantially the plane of said rear wall,
   means for securing said one of said segments in the area of said bottom wall.

2. Structure as specified in claim 1 wherein,
   said other of said segments has a relatively large opening therein to permit a power plug contained in said housing to extend therethrough for insertion into an outlet.

3. Structure as specified in claim 2 wherein,
   said other of said cooperating segments is disposed in substantially the plane of said rear wall but extends in the opposite direction therefrom relative to said bottom wall.

4. Structure as specified in claim 3 wherein, said adapting means comprises:
   a pair of spaced apart apertures disposed on opposite sides of said relatively large opening.

5. Structure as specified in claim 4 including,
   screw means insertable through one of said apertures for fastening one end of said other of said segments, and
   a member having a protuberance insertable in the other of said apertures, said member cooperating with said screw means to support said structure and prevent rotation thereof about said screw.

6. Structure as specified in claim 5 wherein,
   said member cooperating with said screw means comprises a substantially L-shaped configuration adapted to rest on the edge of an outlet cover plate.

References Cited
UNITED STATES PATENTS

| | | | |
|---|---|---|---|
| 3,143,697 | 8/1964 | Springer | 320—2 |
| 3,194,621 | 7/1965 | Frost | 312—206 |
| 3,371,260 | 2/1968 | Jackson et al. | 312—209 X |

CASMIR A. NUNBERG, Primary Examiner

U.S. Cl. X.R.

312—206, 223